Dec. 2, 1952　　　　　S. WANAMAKER　　　　　2,619,861
SPANNER WRENCH WITH AXIAL LUGS
Filed Dec. 8, 1949　　　　　　　　　　　2 SHEETS—SHEET 1
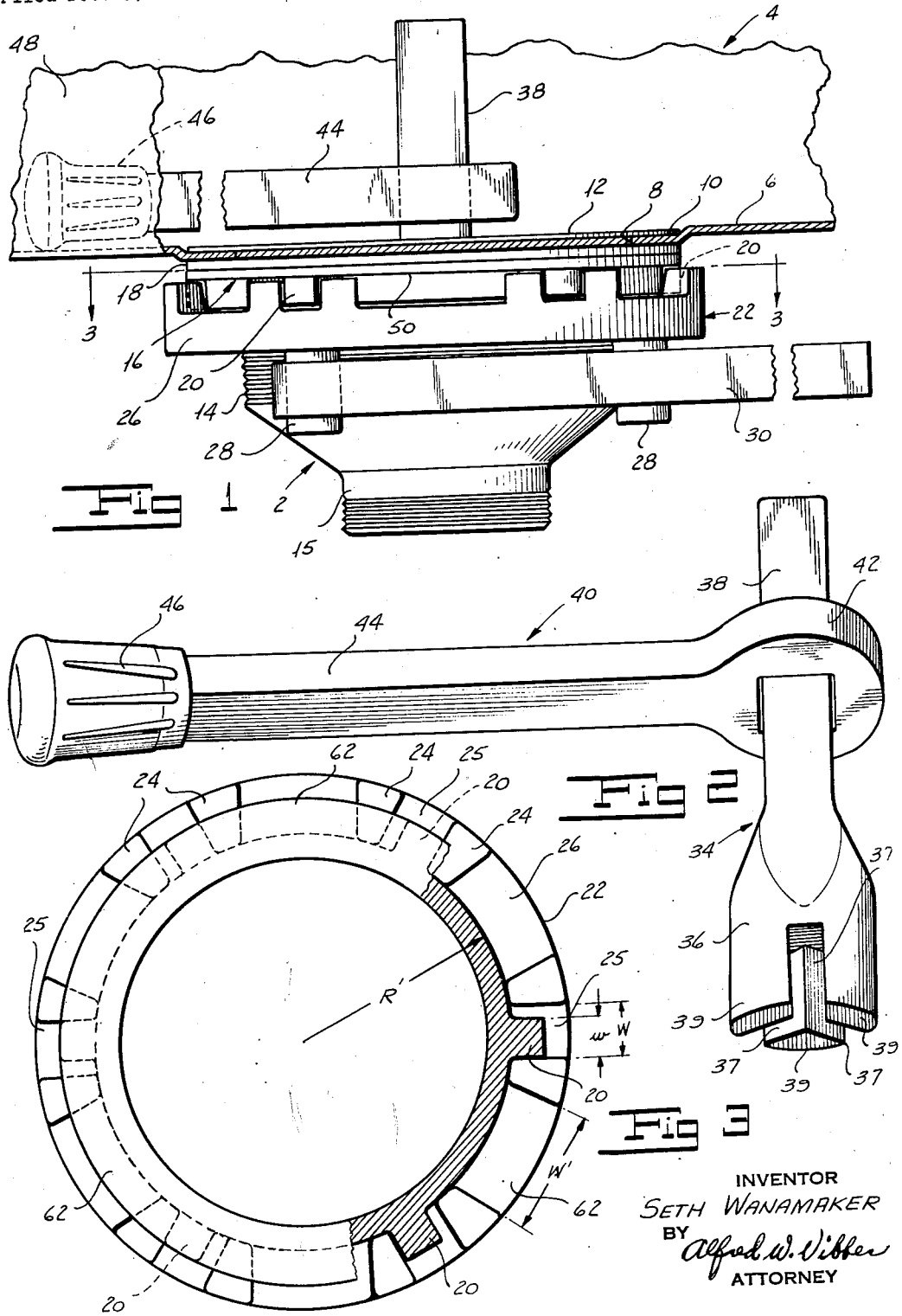
INVENTOR
SETH WANAMAKER
BY Alfred W. Vibber
ATTORNEY

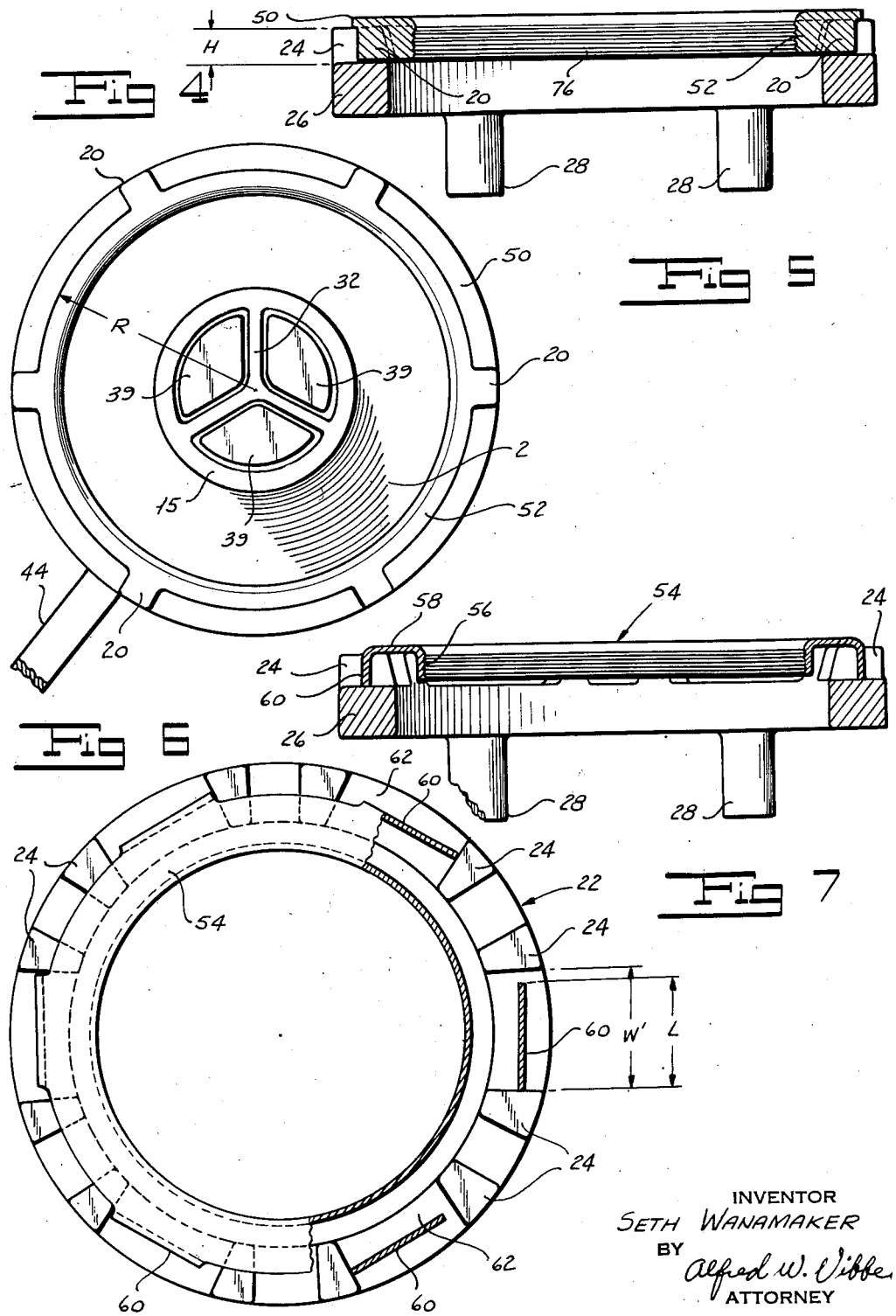

Patented Dec. 2, 1952

2,619,861

UNITED STATES PATENT OFFICE 2,619,861

SPANNER WRENCH WITH AXIAL LUGS

Seth Wanamaker, Ramsey, N. J.

Application December 8, 1949, Serial No. 131,729

3 Claims. (Cl. 81—90)

This invention relates to a tool or device for assembling or disassembling a fitting such as the strainer in a sink. The invention has as elements thereof: a wrench or spanner for engaging the retaining nut on the bottom of the strainer; a strainer restraining tool for preventing rotation of the main part of the strainer while the nut thereon is being manipulated; and the combination of the nut engaging wrench and the strainer restraining device.

One conventional strainer or outlet fitting now employed in sinks in homes consists of a bell-shaped member made of sheet metal, such member having an outwardly projecting flange which fits downwardly within a shallow well at the outlet hole in the sink. Connection of the sink strainer to the sink, and its sealing thereto, are effected by means of a nut screwed upon the upper, larger diameter, portion of the strainer beneath the bottom surface of the sink, there being a gasket interposed between the bottom surface of the sink and the upper surface of the nut.

The thus described sink strainer is made smooth in external contour, and also has very little by way of irregular surface interiorly thereof whereby the strainer may be grasped as by a wrench or similar tool or even by one's hand to prevent it from rotation when it is assembled in the sink or disassembled therefrom. Consequently, even when two plumbers are available, the assembly and disassembly of the sink strainer with respect to the sink is a difficult operation, the disassembly, particularly when the parts have become corroded through long use, being exceedingly difficult. Furthermore, because of the width of the sink, it is very difficult, if not impossible, for one plumber, in installing such strainer, or in removing it from the sink, to hold the strainer from rotation while he is manipulating the strainer holding nut from beneath the sink. Where it has been attempted to hold the strainer by engagement of the threaded tail-piece by a tool such as a wrench, the inevitable result is the scarring and deformation of the threads on the tail-piece such that further operation of the nut therealong becomes difficult if not impossible.

It is accordingly among the objects of the present invention to provide a simple, light, easily carried and easily applied strainer nut engaging wrench or spanner for use in the described assembling and disassembling operations.

A further object of the invention resides in the provision of a wrench of the type set out above, such wrench being further characterized by such design that it is immediately applicable to either of the two conventional types of nuts used in the securing of such sink strainers, one of such nuts having narrow depending lugs thereon, and the other type having wide depending flanges acting as lugs thereon.

Yet another object of the invention lies in the provision of a sink strainer restraining device which allows the assembly and disassembly of the strainer with respect to the sink by one plumber working below the sink, such device minimizing the possibility of scarring of the sink and the deformation or other injury of the sink strainer and the threaded tail-piece thereof, and being of such design as to leave the bottom portion of the strainer freely accessible to the strainer nut engaging means.

A further object of the invention resides in the provision of a sink strainer assembling and disassembling device consisting of the combination of the above described sink strainer nut engaging spanner and the sink strainer restraining tool.

These and further objects of the invention will be more readily apparent in the following description of a preferred embodiment of the strainer assembling and disassembling device of the invention.

In the drawings accompanying the specification, and forming a part thereof:

Fig. 1 is a view in vertical cross-section through a sink having a strainer applied thereto, the sink strainer being shown in side elevation, there being a strainer restraining device assembled in the strainer and a strainer nut engaging spanner, made in accordance with the present invention, assembled on the nut as in an assembling operation;

Fig. 2 is a view in bottom perspective of the sink strainer restraining tool shown in Fig. 1;

Fig. 3 is a view, partially in plan and partially in horizontal section, of the first type of strainer retaining nut, shown in Fig. 1, with the nut engaging spanner of the invention applied thereto the section being taken along the line 3—3 in Fig. 1;

Fig. 4 is view in bottom plan of the sink strainer with the first type of retaining nut applied thereto and with sink strainer restraining device in position therein;

Fig. 5 is a view in axial, diametral, cross-section through the assembly of the first type of retaining nut with the spanner applied thereto;

Fig. 6 is a view similar to Fig. 3, the second type of strainer retaining nut being shown engaged by the spanner; and Fig. 7 is a view in axial, diametral, cross-section through the second type of nut with the spanner applied thereto.

In Fig. 1 the sink strainer, generally designated by the reference character 2, is shown assembled in a sink, generally designated by the reference 4. The sink has through the bottom 6 thereof a circular opening 8, around which there is provided a downwardly extending shallow well or depression 10. The upper, horizontally extending flange 12 of the sink strainer 2 fits within the well 10, as is conventional in the art. Strainer 2 is generally in the form of two coaxial cylinders connected by a frusto-conical portion, the upper, larger diameter, cylinder 14 having threads thereon, and the lower, smaller diameter, cylinder, which is designated 15, having threads thereon for connection to the trap (not shown) to which the sink discharges. Strainer 2 is retained in the sink by the nut 16, which is threadedly received upon the threaded portion 14, there being an annular gasket 18, made of rubber or the like, which is received between the bottom surface of sink bottom 6 at the well 10 and the upper surface of nut 16 at the flange 50 thereon.

Retaining nut 16 is provided with a plurality of depending equally angularly spaced lugs 20, to be more particularly described hereinafter. In Fig. 1 there is shown the spanner or wrench 22, which forms one element of the combination assembling and disassembling device of the invention. Spanner 22, which, as will be seen in Figs. 3, 5, 6, and 7, is generally of annular shape, is received over the larger threaded portion of the strainer, upstanding lugs on the upper face of the spanner receiving therebetween the lugs 20 on nut 16. The lugs on the upper face of the spanner, which are designated 24, will be more particularly described hereafter as to their size, configuration, and spacing relative to each other on the body of the spanner. Depending from the lower surface of the annular body 26 of the spanner are four equally spaced bosses or lugs 28, which, in the embodiment shown, are cylindrical in horizontal section. Bosses 28 are designed sequentially to receive thereover one end of the spanner operating handle 30, such end, that at the left in Fig. 1, being provided with a vertical hole therethrough to receive the boss 28. As the device is shown in Fig. 1, it is applied to the strainer retaining nut 16 in such manner as to effect tightening of the nut on the strainer. In such position the shank of the handle 30, at the right in Fig. 1, is thrust in a direction into the paper as the device is shown in such figure, an intermediate portion of the handle contacting the boss 28 shown at the right in that figure. For the disassembling operation, it is, of course, necessary only to apply the handle 30 to the boss shown, for instance, at the right in Fig. 1, the handle being swung to the left in Fig. 1 and its end thrust in a direction into the paper at the left in Fig. 1. It will be appreciated from a consideration of Figs. 1 and 3 that the forces applied to annular body member 22 by the handle 30 at the two lugs 28 engaged by such handle when it is in the operative position shown in Fig. 1 are roughly parallel to each other and are generally tangential to the opening through such annular body member 22.

The wrench or spanner 22 thus far described and to be more particularly described below, affords means whereby the strainer retaining nut may be positively grasped and manipulated by a plumber working from beneath the sink, such spanner operating in a manner such that it does not engage or mar any of the parts of the strainer. As above explained the strainer itself is so made as to be smooth in external contour and to present very little internal irregularity whereby it may be grasped to hold it from rotation while the nut 16 is thus engaged by the spanner. There is, of course, a great tendency for the strainer 2 to rotate with respect to the sink upon turning of the retaining nut both in the assembly and disassembly operations, because the strainer is held from rotation simply by reason of its frictional contact with the sink at the well 10.

The particular type of sink strainer shown, however, is provided internally thereof at a point about at the top of the lower smaller diameter cylindrical portion 15 with a three-strutted cross strainer generally designated 32, which is shown in Fig. 4. Structure 32, which forms a rough strainer below the removable basket (not shown) customarily inserted in the strainer 2, is of heavy enough construction so that it may be used as a means of engagement for the upper, strainer engaging and restraining device now to be described. Such restraining device, which is shown more particularly in Fig. 2, consists of a vertical stem-like member generally designated 34, such member having an enlarged lower end 36 and an upper shank 38 which in this instance is of square cross section. Lower portion 36 of the stem-like member is of an inner diameter such that it readily fits downwardly within the smaller diametered portion 15 of the strainer. Portion 36 is slotted, as shown, in three equally spaced angular directions around the axis thereof toward the center so as to form three slots 37 which divide portion 36 into the three equally spaced sectors 39. As shown in Fig. 4, sectors 39 are of such shape and size as to fit downwardly over and to embrace the three-strutted member 32 in the strainer.

The sink strainer restraining device is completed by the upper horizontal handle member generally designated 40. Member 40 has an enlarged end 42 thereon, end 42 having a square hole therethrough for the sliding reception of shank 38 of the stem-like member. The outer end of shank 44 of member 40 is provided with a resilient bumper member 46 made, for example, of rubber and the like. The combination device of the invention, that is, the nut engaging spanner or wrench and the sink strainer restraining device, are shown in Fig. 1 in the position which they assume when they are engaged in a sink strainer assembling operation. The position of the spanner has already been explained. It will be appreciated that when the shank 30 of the spanner operating handle is pressed in such direction that it goes into the paper in Fig. 1 the sink strainer will tend to be turned in the sink in the same direction. With the sink strainer restraining device in place, however, the shank 38 will turn only far enough to allow the bumper 46 on the end of shank 44 to engage the forward wall 48 of the sink 4, after which rotation of the sink strainer is positively restrained. When the device is employed in a sink strainer disassembling operation, as above explained, the direction of rotation of the spanner 22 is reversed. The stem-like member 38, inserted as before into the sink strainer so that sectors 39 on the bottom thereof telescope over and lie alongside the three-strutted member 32, will be turned in a reverse direction, carrying with it member 40. Such rotation continues however, only until the bumper 46 on the end of arm 44 contacts the forward wall of the sink, or the rear wall thereof if the dimensions are such that the arm does not clear the rear wall. Here again, the sink strainer is positively restrained from rotation while the nut 16 is disassembled therefrom. The sink strainer restraining means is, it will be evident, of such design as to leave the bottom part of the strainer nut freely accessible to the strainer nut engaging means.

Nut 16, shown in Figs. 1, 3, 4, and 5, is usually of die-cast construction. Such nut has an annular main body 52, there being a flange 50 on the upper part thereof. Below flange 50 and spaced equally about the nut there are a plurality of lugs 20, six in this instance, by which the nut is manipulated. As shown in Fig. 3, lugs 20 have a width $w$, measured at right angles to the radius of the nut. The construction of spanner 22 which allows it to be applied to nut 16 will be apparent from a consideration of Figs. 3 and 5. Equally spaced about one surface of the spanner, shown at the top in Fig. 1 are a plurality of pairs of upstanding lugs 24, there being the same number of pairs of lugs 24 as there are lugs 20 on the nut to be engaged. The adjacent lugs 24 on the spanner in any pair thereof are spaced apart, a distance W as shown in Fig. 3, the spaces between such adjacent lugs being designated 25. As shown in Fig. 4, the main annular portion 52 of nut 16 has an outer radius designated R in Fig. 4. Lugs 24 on spanner 22 have their inner surfaces disposed a distance R' from the center of the spanner, the distance R' at least slightly exceeding the distance R, so that the spanner may be freely received over the bottom portion of the nut with the lugs 20 on the nut between adjacent lugs of the pairs of lugs 24.

As indicated in Fig. 5, in the preferred embodiment the lugs 24 on the spanner 22 have an axial height H which slightly exceeds the corresponding axial height of the lugs 20 on the nut. Thus in the preferred embodiment the underside of the flange 59 of the nut engages the outer horizontal surfaces of the lugs 24 on the spanner. Nut 16 is thus stably and centrally held within the spanner 22 in either the assembling or disassembling operations. In Fig. 3 the spanner is shown in the position it assumes during the assembly operation indicated in Fig. 1.

As above indicated, there are two main types of strainer retaining nuts. One such type, that shown and described at 16, is, as above indicated, die-cast. The other such type of nut is formed by being stamped from a sheet metal blank. Such nut, which is generally designated 54, is shown in Figs. 6 and 7, where the inner threaded sleeve portion is designated 56, the top horizontal flange portion denoted 58, and the depending manipulating lugs thereon are designated 60.

As shown in Figs. 1 and 3, the spanner 22 has between the pairs of adjacent upstanding lugs 24 equally spaced recesses 62 which somewhat exceed in their widths, as measured transverse to the radius, the distance W between the adjacent lugs 24 of each pair. Such wider recesses 62 between adjacent pairs of lugs 24 is shown in Fig. 3 as having a width W'. Dimension W' somewhat exceeds the length of the depending lugs 60 of the nut 54, as more clearly indicated in Fig. 6.

It will be apparent that the spanner 22 will, therefore, receive and manipulate the nut 54 as well as the nut 16, the lugs on the nut 16 being received in the smaller spaces between the lugs 24 of each pair and the lugs 60 on nut 54 being received between the larger spaces between the pairs of lugs. Such narrower and wider spaces between the lugs 24 on the spanner are preferably formed with parallel sides, such as would result by their being cut by an end milling cutters having diameters equal to the widths W and W', respectively, such cutters proceeding in a direction radial of the spanner body. As with nut 16, the nut 54 is stably held by reason of its engagement with spanner 22. The axial height of the lugs 60 of nut 54, as they are shown in Fig. 7, is preferably somewhat less than the axial height H of lugs 24 on the spanner, so that the bottom surfaces of flanges 58 of the nut rest upon the top of the lugs 24 of the spanner. By reason of the angularity of successive lugs 60 of nut 54, the nut engaged with the spanner, as it is shown in Fig. 6, is prevented from being removed therefrom except by axial movement with respect thereto.

The assembling device of the invention is simple, light in construction, and is cheaply made. Parts 40 and 34 may readily be made of forged bar stock. Spanner 22 may be forged, or may even be cast. It is preferred, however, to make the spanner from plate stock, the lugs 24 being formed, as explained, by an end milling operation on the upper face thereof.

When the tool is not in use it may be disassembled to occupy a minimum of space by removing arm 40 from shank 38 and, of course, by removing the operating handle 30 from the spanner 22. When thus disassembled, the parts of the assembling and disassembling device may be made to occupy a rather small space. Thus the device may conveniently be packed and carried to and from the job in a small container such as a shallow elongated box.

Whereas for purposes of illustration I have described and shown a preferred embodiment of the strainer assembly device of my invention, it will be obvious that such device is capable of considerable variations as to details within the scope of the invention. The invention is, therefore, defined by the claims appended hereto.

I claim as new the following:

1. A wrench or spanner adapted for operative engagement with sink strainer retaining nuts, said nuts having a plurality of generally radially directed axially extending narrow lugs on an outer surface thereof, said nuts having a radial thickness which is a small part of the radius of the nuts and of the radius of the axial bore of the nuts, comprising an annular body member, a series of axially directed pairs of upstanding, nut engaging, lugs extending substantially across the upper annular face of the body member, the lugs of each such pair being spaced apart a distance such that they operatively receive between them the relatively narrow lugs on the nut, the radial thickness of the annular body member being a small part of the radius of the opening through such annular body member, and means whereby the annular body member may be rotated when in operative engagement with a nut, said last named means comprising a series of substantially equally spaced, manipulating lugs on the lower face of the annular body, said manipulating lugs being small in number and projecting axially from the lower face of the annular body.

2. A wrench or spanner adapted for operative engagement with sink strainer retaining nuts, said nuts having a plurality of generally radially directed axially extending narrow lugs on an outer surface thereof, said nuts having a radial thickness which is a small part of the radius of the nuts and of the radius of the axial bore of the nuts, comprising an annular body member, a series of axially directed pairs of upstanding, nut engaging, lugs extending substantially across the upper annular face of the body member, the lugs of each such pair being spaced apart a distance such that they operatively receive between them the relatively narrow lugs on the nut, the radial thickness of the annular body member being a small part of the radius of the opening through such annular body member, and means whereby the annular body member may be rotated when in operative engagement with a nut, said last named means comprising a series of substantially equally spaced, manipulating lugs on the lower face of the annular body, said manipulating lugs being small in number and projecting axially from the lower face of the annular body, and a handle adapted to engage two adjacent ones of such manipulating lugs to turn the annular body, the manipulating lugs being present in such number and the handle engaging two of said lugs having such engagement therewith that the forces imposed upon the annular body member by the handle are roughly parallel to each other and generally tangential to the opening through the annular body member.

3. A wrench or spanner adapted for operative engagement with sink strainer retaining nuts, said nuts having a plurality of generally radially directed axially extending narrow lugs on an outer surface thereof, said nuts having a radial thickness which is a small part of the radius of the nuts and of the radius of the axial bore of the nuts, comprising an annular body member, a series of axially directed pairs of upstanding, nut engaging, lugs extending substantially across the upper annular face of the body member, the lugs of each such pair being spaced apart a distance such that they operatively receive between them the relatively narrow lugs on the nut, the radial thickness of the annular body member being a small part of the radius of the opening through such annular body member, and means whereby the annular body member may be rotated when in operative engagement with a nut, said last named means consisting of four substantially equally spaced manipulating lugs on the lower face of the annular body, said manipulating lugs axially projecting from the lower face of the annular body, and a handle adapted to engage two adjacent ones of such manipulating lugs to turn the annular body, such handle having an opening through one end thereof to receive a first one of said manipulating lugs therein, the handle being of such length as to span the distance between such first and a second adjacent manipulating lug and to extend a substantial distance beyond such second manipulating lug, the manipulating lugs being so located radially of the annular body member that the forces imposed by the handle so mounted upon such body member extend roughly parallel to each other and generally tangential to the opening through the annular body member.

SETH WANAMAKER.

REFERENCES CITED

The following references are of record in the file of this patent:

UNITED STATES PATENTS

| Number | Name | Date |
| --- | --- | --- |
| 511,485 | Wood et al. | Dec. 26, 1893 |
| 627,292 | Brant | June 20, 1899 |
| 668,043 | Fry | Feb. 12, 1901 |
| 1,371,965 | York | Mar. 15, 1921 |
| 1,467,936 | Janssen | Sept. 11, 1923 |
| 1,676,775 | Doherty | July 10, 1928 |
| 2,445,905 | Busby | July 27, 1948 |

FOREIGN PATENTS

| Number | Country | Date |
| --- | --- | --- |
| 6,255 | Great Britain | Mar. 15, 1906 |
| 618,652 | Great Britain | Feb. 24, 1949 |

OTHER REFERENCES

Popular Mechanics, page 623, April 1936.